(12) United States Patent
Park et al.

(10) Patent No.: US 11,879,876 B2
(45) Date of Patent: Jan. 23, 2024

(54) HEATER INTEGRATED GAS CHROMATOGRAPHY COLUMN DEVICE

(71) Applicant: BIONEER CORPORATION, Daejeon (KR)

(72) Inventors: Han-Oh Park, Daejeon (KR); Taeman Kim, Mungyeong-si (KR); Jong Rok Ahn, Daejeon (KR); Jae-Ha Kim, Daejeon (KR)

(73) Assignee: BIONEER CORPORATION, Daejeon (KR)

( * ) Notice: Subject to any disclaimer, the term of this patent is extended or adjusted under 35 U.S.C. 154(b) by 390 days.

(21) Appl. No.: 17/309,868

(22) PCT Filed: Oct. 24, 2019

(86) PCT No.: PCT/KR2019/014088
§ 371 (c)(1),
(2) Date: Jun. 24, 2021

(87) PCT Pub. No.: WO2020/138679
PCT Pub. Date: Jul. 2, 2020

(65) Prior Publication Data
US 2022/0074898 A1    Mar. 10, 2022

(30) Foreign Application Priority Data
Dec. 28, 2018    (KR) .......................... 10-2018-0171725

(51) Int. Cl.
*G01N 30/30*    (2006.01)
*G01N 30/60*    (2006.01)
(Continued)

(52) U.S. Cl.
CPC ......... *G01N 30/30* (2013.01); *G01N 30/6052* (2013.01); *H05B 3/145* (2013.01);
(Continued)

(58) Field of Classification Search
CPC ...... G01N 2030/025; G01N 2030/3053; G01N 30/02; G01N 30/30; G01N 30/54;
(Continued)

(56) References Cited

U.S. PATENT DOCUMENTS

| | | | | |
|---|---|---|---|---|
| 4,343,767 A | * | 8/1982 | Long ................ | G01N 30/64 73/61.58 |
| 5,114,439 A | * | 5/1992 | Yost ................. | G01N 30/30 95/87 |

(Continued)

FOREIGN PATENT DOCUMENTS

| | | |
|---|---|---|
| CN | 104122351 A | 10/2014 |
| CN | 104407080 A | 3/2015 |

(Continued)

OTHER PUBLICATIONS

Office Action in Japanese Application No. 2021-538012 dated Jul. 5, 2022 in 5 pages.

(Continued)

*Primary Examiner* — Andre J Allen
(74) *Attorney, Agent, or Firm* — Knobbe, Martens, Olson & Bear, LLP

(57) ABSTRACT

A heater integrated gas chromatography (GC) column device according to the present invention is capable of precisely and uniformly controlling a temperature by having a high thermal conductivity, and raising and lowering a temperature at a high speed by having a low thermal mass, such that a measuring time is significantly decreased. The GC column is in contact with a bobbin with a homogeneous temperature distribution, and thus a temperature is homogeneously distributed in each GC column. Further, the heater integrated GC column device according to the present invention has the above-described effects and may have a smaller size.

12 Claims, 2 Drawing Sheets

(51) Int. Cl.
*H05B 3/14* (2006.01)
*G01N 30/02* (2006.01)

(52) U.S. Cl.
CPC .............. *G01N 2030/025* (2013.01); *G01N 2030/3053* (2013.01)

(58) Field of Classification Search
CPC ...... G01N 30/6052; H05B 3/14; H05B 3/145; H05B 3/01
See application file for complete search history.

(56) References Cited

U.S. PATENT DOCUMENTS

| | | | |
|---|---|---|---|
| 10,067,101 B2 * | 9/2018 | Traudt | G01N 30/30 |
| 2005/0100479 A1 | 5/2005 | White et al. | |
| 2016/0077063 A1 * | 3/2016 | Traudt | G01N 30/30 73/23.39 |
| 2016/0116447 A1 * | 4/2016 | Dryden | H05B 3/20 219/539 |
| 2016/0254072 A1 | 9/2016 | Park et al. | |
| 2017/0105247 A1 * | 4/2017 | Harrison | H05B 1/0247 |
| 2020/0049673 A1 * | 2/2020 | Lim | G01N 30/6095 |
| 2020/0292507 A1 * | 9/2020 | Numata | G01N 30/6047 |

FOREIGN PATENT DOCUMENTS

| | | | | |
|---|---|---|---|---|
| CN | 106851873 A | | 6/2017 | |
| CN | 208596140 U | * | 3/2019 | |
| DE | 112013000431 T5 | * | 6/2015 | ............ G01N 30/06 |
| JP | S62-145151 U | | 9/1987 | |
| JP | 2000-009710 A | | 1/2000 | |
| JP | 2007527013 A | * | 9/2007 | |
| JP | 2016-533001 A | | 10/2016 | |
| KR | 10-2010-0090621 A | | 8/2010 | |
| KR | 10-2015-0119034 A | | 10/2015 | |
| KR | 10-2018-0035024 A | | 4/2018 | |

OTHER PUBLICATIONS

European Search Report (ESR) dated Aug. 1, 2022 for EP Patent Application No. 19902524.8 dated Aug. 1, 2022 in 8 pages.
International Search Report of PCT Application No. PCT/KR2019/014088—2 pages (dated Feb. 6, 2020).

* cited by examiner

[Fig. 1]
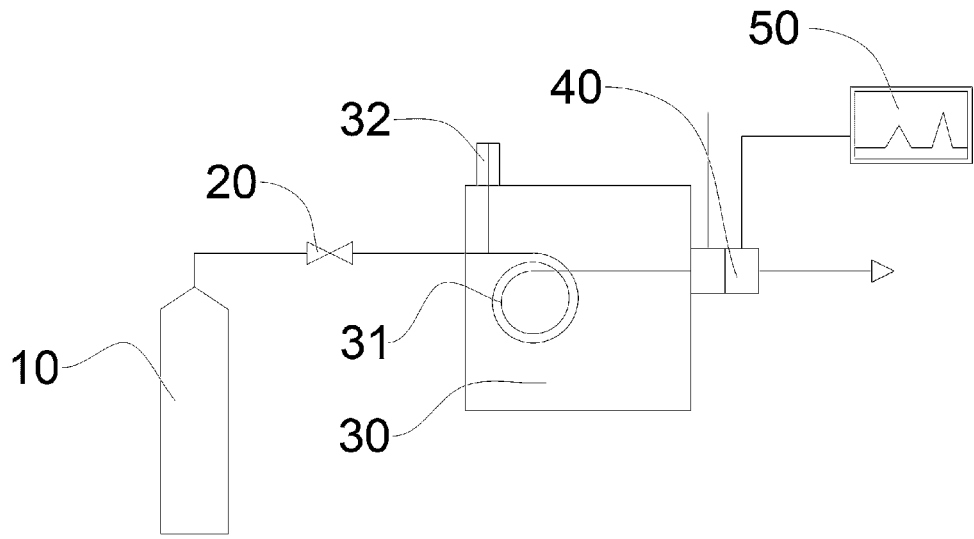
[Fig. 2]
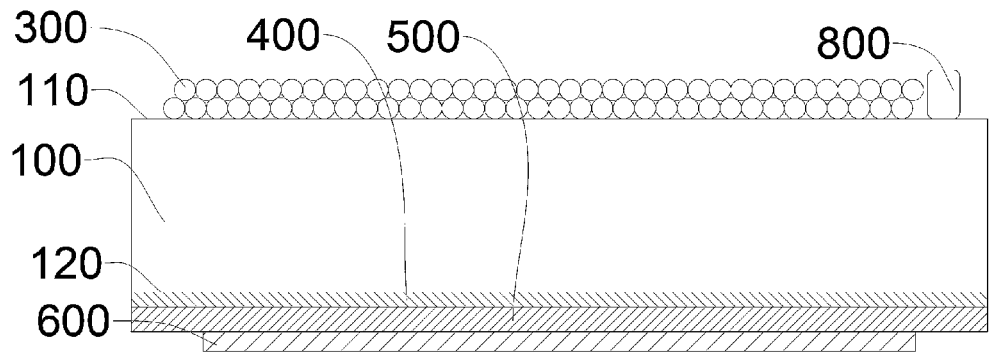
[Fig. 3]
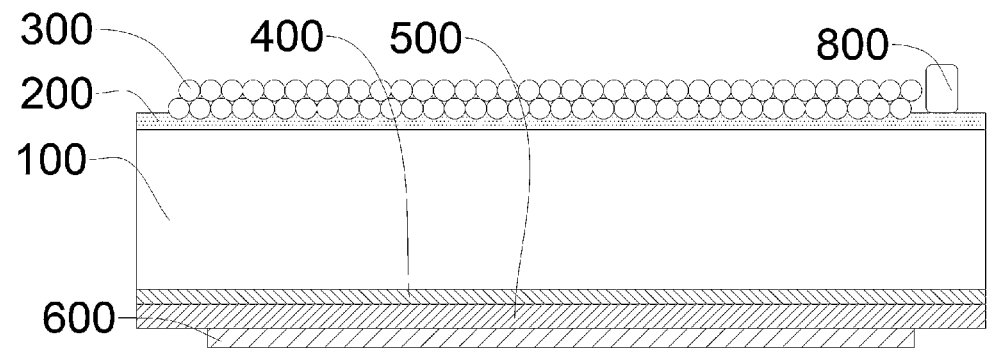
[Fig. 4]
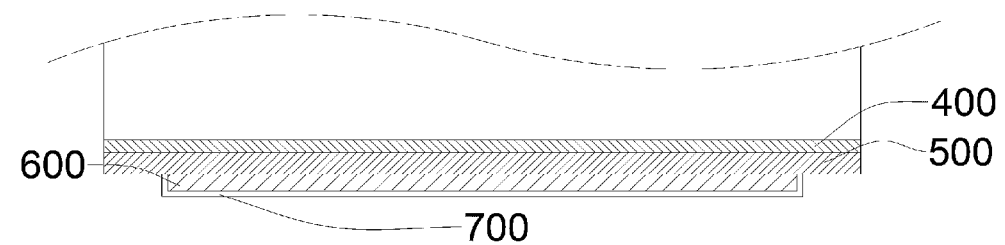

[Fig. 5]
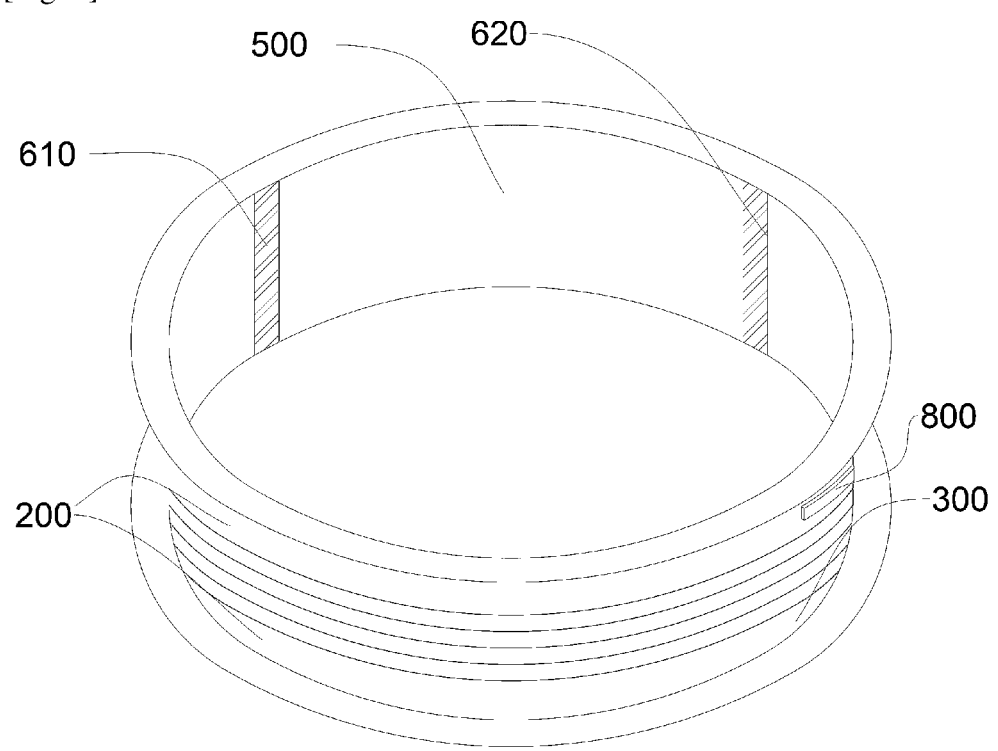

HEATER INTEGRATED GAS CHROMATOGRAPHY COLUMN DEVICE

TECHNICAL FIELD

The present invention relates to a heater integrated gas chromatography (GC) column device.

BACKGROUND ART

In a general gas chromatography column (GC) device according to the related art, a separating column is held in a forced convection oven forcibly causing air to convect to reduce a temperature distribution as illustrated in FIG. 1, thereby controlling a temperature of the separating column. Heating of the separating column performed by the forced convection oven is excellent in terms of thermal homogeneity and is less affected by an ambient temperature.

However, since the oven has a high thermal mass, it is not easy to control a temperature rising speed and a temperature falling speed of the column, it is difficult to precisely adjust a temperature gradient, and a size of the device becomes very large, which is disadvantageous. In the device including the forced convection oven, a response time required to raise or lower a temperature, that is, a response time required to change a temperature to a set temperature is long, which affects a time required to stabilize the set temperature. Therefore, a time required for analysis is increased and accuracy of the analysis is reduced.

Recently, a gas chromatography device including a heat conduction type temperature adjusting unit which controls a temperature of a separating column through heat conduction from a heater without going through air has been suggested. Since the heat conduction type temperature adjusting unit has a lower thermal mass than that of the convection oven, it is possible to control the temperature at a higher response speed. However, there is a demand for technical development in order to further improve thermal conductivity, and technical research for implementing a more precise temperature control, a steep temperature gradient, a significant decrease in measuring time, and a smaller size of the device is required.

DISCLOSURE OF INVENTION

Technical Problem

An object of the present invention is to provide a heater integrated gas chromatography (GC) column device capable of precisely and uniformly controlling a temperature by having a high thermal conductivity, and raising and lowering a temperature at a high speed by having a low thermal mass, such that a measuring time is significantly decreased.

Another object of the present invention is to provide a heater integrated GC column device having the above-described effect and having a high temperature homogeneity for each GC column to implement an excellent resolution of the GC column.

Another object of the present invention is to provide a heater integrated GC column device having the above-described effects and having a structure capable of implementing a smaller size of the device.

Solution to Problem

In one general aspect, a heater integrated gas chromatography (GC) column device includes: a bobbin formed of a metal having a high thermal conductivity; an insulating layer including a metal oxide film formed on an inner surface of the bobbin; a heat generating layer bonded to the insulating layer and including any one or more selected from the group consisting of carbon nanotubes and a carbon nanotube-metal composite; an electrode formed to be in contact with the heat generating layer; and a GC column wound around the bobbin while being adjacent to an outer surface of the bobbin.

The heater integrated GC column device may further include a bonding layer formed between the outer surface of the bobbin, and the GC column.

The bonding layer may be formed of an epoxy resin having a high conductivity.

The metal may be copper, magnesium, aluminum, or an alloy thereof.

An average thickness of the bonding layer is 10 to 500 µm.

The metal oxide insulating layer may be a copper oxide film, a magnesium oxide film, or an aluminum oxide film formed by oxidizing the inner surface of the bobbin.

The heat generating layer may include the carbon nanotube-metal composite, and a metal of the carbon nanotube-metal composite may include any one or two or more selected from the group consisting of silver, platinum, gold, copper, nickel, iron, cobalt, and aluminum.

A sheet resistance of the heat generating layer may be 2 to 15 Ω/sq.

The heater integrated GC column device may further include a noble metal layer covering the metal electrode.

An average thickness of the insulating layer may be 2 to 100 µm and an average thickness of the heat generating layer may be 20 to 100 µm.

The GC column may be a packed column or a capillary column.

The heater integrated GC column device may further include any one or more temperature sensor devices selected from a contact type temperature sensor device including any one or two or more selected from a thermocouple temperature sensor, a resistive temperature detector (RTD), and a thermistor temperature sensor, and a non-contact type temperature sensor device including an infrared temperature sensor, the one or more temperature sensor devices being disposed on an inner side or an outer side of the bobbin.

Advantageous Effects of Invention

The heater integrated GC column device according to the present invention may precisely and uniformly control a temperature by having a high thermal conductivity and may implement a steep temperature gradient by having a low thermal mass, such that a measuring time is significantly decreased.

In the heater integrated GC column device according to the present invention, the GC column is in contact with the bobbin with a homogeneous temperature distribution, and thus a temperature is homogeneously distributed in each GC column, thereby implementing an excellent resolution.

The heater integrated GC column device according to the present invention has the above-described effects and may have a smaller size.

Even though not explicitly mentioned in the present invention, the effects described in the specification anticipated by the technical features of the present invention and their inherent effects are considered as being described in the specification of the present invention.

BRIEF DESCRIPTION OF DRAWINGS

FIG. 1 illustrates a gas chromatography (GC) column device system including a forced convection oven according to the related art.

FIGS. 2 to 4 are views each illustrating a cross section of a heater integrated GC column device according to the present invention.

FIG. 5 is a perspective view of the heater integrated GC device according to the present invention.

DETAILED DESCRIPTION OF MAIN ELEMENTS

10: Carrier gas
20: Flow controller
30: Column oven
31: GC column portion
32: Injector port
40: Detector
50: Recorder
100: Bobbin
110: Outer surface of bobbin
120: Inner surface of bobbin
200: Bonding layer
300: GC column
400: Insulating layer
500: Heat generating layer
600: metal electrode
610: First metal electrode
620: Second metal electrode
700: Noble metal layer
800: Temperature sensor device

BEST MODE FOR CARRYING OUT THE INVENTION

Hereinafter, a heater integrated gas chromatography (GC) column device according to the present invention will be described in detail with reference to the accompanying drawings.

The drawings of the present invention are provided by way of example so that the spirit of the present invention can be sufficiently transferred to those skilled in the art. Therefore, the present invention is not limited to the accompanying drawings, but may be modified in many different forms. In addition, the accompanying drawings may be exaggerated in order to clear the spirit and scope of the present invention.

Technical terms and scientific terms used in the present invention have the general meaning understood by those skilled in the art to which the present invention pertains unless otherwise defined, and a description for the known function and configuration unnecessarily obscuring the gist of the present invention will be omitted in the following description and the accompanying drawings.

Unless the context clearly indicates otherwise, it should be understood that a term in singular form used in the present invention includes the term in plural form.

Unless particularly defined, the term "%" used herein without definition refers to "wt %".

A heater integrated GC column device according to the present invention includes: a bobbin 100 formed of aluminum; an insulating layer 400 including an aluminum oxide film formed on an inner surface 120 of the bobbin 100; a heat generating layer 500 stacked on the insulating layer 400 and including any one or more selected from the group consisting of carbon nanotubes and a carbon nanotube-metal composite; a metal electrode 600 formed to be in contact with the heat generating layer 500; and a GC column 300 wound around the bobbin 100 while being adjacent to an outer surface 110 of the bobbin 100 as illustrated in FIG. 2 by way of example.

In the heater integrated GC column device according to the present invention, electric energy is applied to the metal electrode 600, the electric energy is converted into thermal energy with high efficiency in the heat generating layer 500, and the thermal energy is transferred to the bobbin 100, and then transferred to the GC column 300 or transferred to the GC column 300 through a bonding layer as described later. At this time, as the conversion and transfer of the energy are performed with significantly reduced energy loss, a maximum temperature change per hour is significantly increased, more precise temperature adjustment is possible, and a control to minimize a temperature deviation over the entire GC column 300 is possible.

The bobbin 100 has a general structure having the inner surface 120 and the outer surface 110, and may be one to which energy may be applied to radiate heat to the outer surface 110 or the outside. The bobbin 100 is commonly used in a heater technical field, and thus is not particularly limited. As a specific example, the bobbin 100 may have a cavity therein, be formed of a metal, and have a pipe-like structure or a cylinder-like structure.

Dimensions of the bobbin 100, for example, a size such as a length, a width, and a thickness, and a shape of the bobbin 100 may be appropriately adjusted according to a size of the device, and thus are not particularly limited. However, it is preferable that the bobbin 100 has a small size in order to effectively implement characteristics such as a high thermal conductivity and a low thermal mass, and characteristics such as precise temperature adjustment, a steep temperature gradient, and a significantly reduced measuring time. As a specific example, an average thickness of the bobbin 100, that is, an average distance between the outer surface 110 and the inner surface 120 of the bobbin 100 may be appropriately adjusted according to the size of the device. For example, the average thickness of the bobbin 100 may be 100 to 500 μm, but is not limited thereto.

According to a specific embodiment, the bobbin 100 includes the insulating layer 400 that is an aluminum oxide film formed on the inner surface 120. As the bobbin 100 formed of aluminum and having the inner surface 120 on which the aluminum oxide film is formed has a structure including the respective layers described above, the heater integrated GC column device has a low thermal mass, such that it is possible to implement a steep temperature gradient and a reduction in analysis time.

Specifically, the insulating layer 400 may be an aluminum oxide film formed by anodizing the inner surface 120 of the bobbin 100. The "anodizing" is to intentionally oxidize (corrode) a surface of a metal material to form an oxide film on a surface portion. By doing so, the oxide film itself serves to protect a product from an external influence and coloring may also be performed on a surface of the oxide film. An anodic oxidation method may be used for an aluminum metal, and anodizing of the aluminum metal using the anodic oxidation method or the like is widely known technology, and thus application thereof may be performed with reference to various known documents.

In an example according to the present invention, as the bobbin 100 formed of aluminum, a bobbin formed of various types of aluminum-based metals may be used. For example, the bobbin 100 may be formed of aluminum 6061, but the present invention is not limited thereto.

In an example according to the present invention, the bobbin 100 formed of aluminum and having the inner surface 120 on which the aluminum oxide film is formed has a specific heat capacity of 0.150 to 0.400 cal/g° C. According to an embodiment, the bobbin 100 may have a specific heat capacity of 0.214 cal/g° C., but the present invention is not limited thereto.

The GC column 300 is wound around the bobbin 100 while being adjacent to the outer surface 110 of the bobbin 100. Here, an outer surface of the GC column 300 may be in contact with the outer surface 110 of the bobbin 100 or may be spaced apart from the outer surface 110 of the bobbin 100 by a predetermined distance. Specifically, a portion of the GC column 300 that is initially wound in a process in which the GC column 300 is wound around the bobbin 100 may be in contact with the outer surface 110 of the bobbin 100 as illustrated in FIGS. 2 and 3 by way of example. Further, the wound GC column 300 may be in contact with the outer surface 110 of the bobbin 100, but a portion of the GC column that is wound later may be in contact with the portion of the GC column 300 that is initially wound and may be spaced apart from the outer surface 110 of the bobbin 100 by a predetermined distance.

In an example according to the present invention, it may be preferable that the heater integrated GC column device further includes a bonding layer 200 formed between the outer surface 110 of the bobbin 100, and the GC column 300 as illustrated in FIG. 3 by way of example. It may be preferable that the bonding layer 200 has a high thermal conductivity and a high elasticity. The bonding layer 200 not only serves to fix the outer surface 110 of the bobbin 100, and the GC column 300 so that the outer surface 110 of the bobbin 100, and the GC column 300 more closely adhere to each other, but also serves to improve a thermal conductivity and prevent a problem such as contact failure caused by expansion of the GC column 300 due to a rapid temperature change.

Specifically, since the heater integrated GC column device according to the present invention has a high temperature reactivity, a rapid temperature change is caused. As a result, expansion of the GC column 300 due to the rapid temperature change may be significantly increased. The rapid expansion of the GC column 300 causes various problems such as formation of a gap in the device, and contact failure between the GC column 300 and the bobbin 100. Therefore, the bonding layer having a high elasticity may be formed between the GC column 300 and outer surface 110 of the bobbin 100 to prevent the thermal conductivity from decreasing due to a gap between the GC column 300 and the bobbin 100. Further, as described above, the GC column 300 may also be spaced apart from the outer surface 110 of the bobbin 100 by a predetermined distance. Therefore, in the case in which the bonding layer 200 is formed in a gap between the outer surface 110 of the bobbin 100, and the GC column 300, conduction of thermal energy of the bobbin 100 to the GC column 300 may be facilitated. The bonding layer 200 may be formed of any material having a high thermal conductivity and a high elasticity. For example, the bonding layer 200 may be formed of a heat-resistant silicone having a high conductivity, or an epoxy resin, and more preferably, may be formed of a modified silicone having a high heat resistance and a high elasticity, or an epoxy resin, but this is only a preferred example and various materials having a similar effect may be used. Therefore, it is a matter of course that the present invention is not limited thereto.

In an example according to the present invention, an average thickness of the bonding layer 200 may be appropriately adjusted according to a volume of the GC column 300. For example, the average thickness of the bonding layer 200 may be 10 to 500 μm, and specifically, 20 to 200 μm. However, this is only a preferred example and it is a matter of course that the present invention is not limited thereto.

A diameter of the GC column 300 may have any value commonly used therefor, and is not limited since various types of GC columns 300 may be used. For example, a packed column or a capillary column may be used as the GC column 300. However, even in the case in which various types of GC columns other than the packed column and the capillary column are applied, all the effects of the present invention may be implemented and the technical idea of the present invention is not vitiated. Therefore, it is a matter of course that the present invention is not limited thereto.

The heat generating layer 500 includes any one or two or more selected from the group consisting of carbon nanotubes and a carbon nanotube-metal composite, and the heat generating layer 500 may be a film (thin film) formed of a planar heating element including the carbon nanotubes or the carbon nanotube-metal composite. More preferably, the film may include the carbon nanotubes or the carbon nanotube-metal composite, and may include a silicone adhesive. In the case in which the heat generating layer 500 includes the carbon nanotube-metal composite, a metal of the carbon nanotube-metal composite may include any one or two or more selected from the group consisting of silver, platinum, gold, copper, nickel, iron, cobalt, and aluminum.

As a preferred example, the heat generating layer 500 may further include a silicone adhesive in terms of high temperature stability. Specifically, the heat generating layer 500 may include 20 to 80 wt % of the carbon nanotubes or the carbon nanotube-metal composite, and 20 to 80 wt % of the silicone adhesive. However, this is only a preferred example, and the present invention should not be interpreted as being limited thereto.

The heat generating layer 500 may be formed of a composition having a specific for-mulation, and a method of forming the heat generating layer 500 by using the composition is not particularly limited and a method of applying the composition onto the bobbin 100 and drying or heat-treating the composition may be used by way of example. Here, an application condition (a temperature, a humidity, a time, or the like) and a drying/heat treatment condition (a temperature, a humidity, a time, or the like) may be appropriately adjusted.

A specific example of the composition may include a ceramic paste composition of Korean Patent Publication No. 10-1447478, for example, AccuPaste 제 CNT Heating Paste (TC-1010, manufactured by Bioneer). Specifically, according to Korean Patent Publication No. 10-1447478, the ceramic paste composition includes carbon nanotubes or a carbon nanotube-metal composite, and a silicone adhesive, and may further include any one or two or more selected from the group consisting of an organic binder, a dispersant, and an organic solvent as needed.

In the case in which the composition further includes an organic binder, a dispersant, and an organic solvent, the composition may include 1 to 50 wt % of the carbon nanotubes or the carbon nanotube-metal composite, and 1 to 30 wt % of the silicone adhesive, and may further include any one or two or more selected from 1 to 20 wt % of the organic binder, 1 to 20 wt % of the dispersant, and 1 to 90 wt % of the organic solvent. However, this is only a preferred example, and the present invention should not be interpreted as being limited thereto.

The silicone adhesive is a polymer having a polysiloxane main chain with alternating silicon atoms and oxygen atoms. Silicone generally has a structure in which two organic atomic groups such as alkyl, for example, methyl, ethyl, or propyl, or phenyl (—$C_6H_5$) are bonded to each silicon atom. The silicone adhesive according to the present invention may have a structure in which hydrogen, a hydroxyl group, a methyl group, or a phenyl group may be bonded to a polysiloxane main chain. Here, the polysiloxane main chain, that is, a content of $SiO_2$ may be 45 to 65 wt %, preferably, 47 to 63 wt %, based on 100 wt % of the silicone adhesive. Further, it is preferable that a content of silanol having a hydroxyl group as a functional group is within a predetermined range in the silicone adhesive to have an excellent flexibility while improving a drying property, for example, the content of silanol may be 0.1 to 10 wt % based on 100 wt % of the silicone adhesive, and a ratio of a phenyl group to a methyl group may be selected from the group consisting of mole ratios of 0.3 to 2.5. However, this is only a preferred example, and the present invention should not be interpreted as being limited thereto.

As a specific example, the organic binder may include any one or more selected from the group consisting of ethyl cellulose and nitrocellulose. As a specific example, the dispersant may include any one or two or more selected from the group consisting of a phosphorus ester salt of amino-containing oligomer or polymer, a monoester or diester of phosphoric acid, an acidic dicarboxylic monoester, a polyurethane-polyamine adduct, and a polyalkoxylated monoamine or diamine. As a specific example, the organic solvent may include any one or two or more selected from the group consisting of acetone, methylethyl ketone, methyl alcohol, ethyl alcohol, isopropyl alcohol, butyl alcohol, ethylene glycol, polyethylene glycol, tetrahydrofuran, dimethyl formamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethyleneglycolethylether, and terpineol. However, this is only a specific example, and the present invention should not be interpreted as being limited thereto.

A method for producing the composition is not particularly limited. For example, the composition may be prepared by a method including: preparing a mixed solution including carbon nanotubes or a carbon nanotube-metal composite, and a silicone adhesive; and dispersing the mixed solution. Here, the mixed solution may further include any one or two or more selected from the group consisting of the organic binder, the dispersant, and the organic solvent described above. However, this is only a preferred example, and the present invention should not be interpreted as being limited thereto.

Various types of known carbon nanotubes may be used as the carbon nanotubes, and the carbon nanotubes may have various known lengths and widths. Specifically, the carbon nanotubes may include any one or two or more selected from the group consisting of single wall carbon nanotubes and multi wall carbon nanotubes. The carbon nanotubes may be classified as metallic carbon nanotubes or semiconducting carbon nanotubes based on a characteristic thereof. The carbon nanotubes may have various average lengths and average diameters. For example, an average length and an average diameter of the carbon nanotubes may be 0.1 to 30 µm and 0.1 to 10 nm, respectively, but are not limited thereto. The carbon nanotubes described above are only described as a specific example for explanation, and thus the present invention should not be interpreted as being limited thereto.

In an example according to the present invention, it is preferable that the heat generating layer 500 has a low sheet resistance. For example, a sheet resistance of the heat generating layer 500 may be 2 to 15 Ω/sq. However, this is only a preferred example, and it is a matter of course that the present invention is not limited thereto.

In an example according to the present invention, the metal electrode 600 is formed to be in contact with the heat generating layer 500, and one or two or more metal electrodes 600, for example, a first metal electrode 610 and a second metal electrode 620 may be formed to be in contact with the heat generating layer 500 while being spaced apart from each other. The metal electrode 600 may be any commonly used electrode, for example, an electrode formed of a conductive material such as copper or iron. However, the present invention is not limited thereto. Further, if needed, a noble metal layer 700 covering the metal electrode 600 may be further formed to improve energy efficiency. Examples of a metal used to form the noble metal layer 700 may include gold and platinum, but any noble metals capable of improving energy efficiency may be used without limitation.

The metal electrode 600 may be formed to be in contact with the heat generating layer 500 by various methods, for example, by plating. However, the metal electrode 600 may be formed by various methods other than the plating, and thus the present invention is not limited thereto.

In an example according to the present invention, an average thickness of the insulating layer 400 may be appropriately adjusted according to a degree of anodizing. For example, the average thickness of the insulating layer 400 may be 2 to 100 µm, and specifically, 5 to 50 µm. However, this is only a preferred example and it is a matter of course that the present invention is not limited thereto.

In an example according to the present invention, an average thickness of the heat generating layer 500 may be appropriately adjusted. For example, the average thickness of the heat generating layer 500 may be 20 to 100 µm. According to an embodiment, the average thickness of the heat generating layer 500 may be 60 µm. However, this is only a preferred example and it is a matter of course that the present invention is not limited thereto.

In an example according to the present invention, the heater integrated GC column device may further include a temperature sensor device 800 for sensing a temperature. As the temperature sensor device, various known temperature sensors may be used. As a specific example, the temperature sensor device 800 may include any one or more selected from a contact type temperature sensor device including any one or two or more selected from a thermocouple temperature sensor, a resistive temperature detector (RTD), and a thermistor temperature sensor, and a non-contact type temperature sensor device including an infrared temperature sensor. Further, the temperature sensor device 800 may be disposed at any position as long as it is a position where a temperature of the device may be sensed. For example, the temperature sensor device 800 may be disposed adjacent to an inner side or an outer side of the bobbin.

The heater integrated GC column device according to the present invention may have a temperature rising speed of, for example, 17 to 25° C./sec. According to an embodiment, the heater integrated GC column device according to the present invention may have a very high temperature rising speed of 23° C./sec.

The heater integrated GC column device according to the present invention may have a very high thermal homogeneity.

The heater integrated GC column device according to the present invention may have a low thermal mass and a high energy efficiency.

The invention claimed is:

1. A heater integrated gas chromatography (GC) column device comprising:
    a bobbin formed of a metal having a high thermal conductivity;
    an insulating layer including a metal oxide film formed on an inner surface of the bobbin;
    a heat generating layer bonded to the insulating layer and including any one or more selected from the group consisting of carbon nanotubes and a carbon nanotube-metal composite;
    a metal electrode formed to be in contact with the heat generating layer; and
    a GC column wound around the bobbin while being adjacent to an outer surface of the bobbin.

2. The heater integrated GC column device of claim 1, further comprising a bonding layer formed between the outer surface of the bobbin, and the GC column.

3. The heater integrated GC column device of claim 2, wherein the bonding layer is formed of a heat-resistant silicone or an epoxy resin.

4. The heater integrated GC column device of claim 2, wherein an average thickness of the bonding layer is 10 to 500 μm.

5. The heater integrated GC column device of claim 1, wherein the metal having a high thermal conductivity is selected from the group consisting of copper, magnesium, aluminum and alloys thereof.

6. The heater integrated GC column device of claim 1, wherein the insulating layer is a metal oxide film formed by anodizing the inner surface of the bobbin.

7. The heater integrated GC column device of claim 1, wherein the heat generating layer includes the carbon nanotube-metal composite, and a metal of the carbon nanotube-metal composite includes any one or two or more selected from the group consisting of silver, platinum, gold, copper, nickel, iron, cobalt, and aluminum.

8. The heater integrated GC column device of claim 6, wherein a sheet resistance of the heat generating layer is 2 to 15 Ω/sq.

9. The heater integrated GC column device of claim 1, further comprising a noble metal layer covering the metal electrode.

10. The heater integrated GC column device of claim 1, wherein an average thickness of the insulating layer is 2 to 100 μm and an average thickness of the heat generating layer is 20 to 100 μm.

11. The heater integrated GC column device of claim 1, wherein the GC column is a packed column or a capillary column.

12. The heater integrated GC column device of claim 1, further comprising any one or more temperature sensor devices selected from a contact type temperature sensor device including any one or two or more selected from a thermocouple temperature sensor, a resistive temperature detector (RTD), and a thermistor temperature sensor, and a non-contact type temperature sensor device including an infrared temperature sensor, the one or more temperature sensor devices being disposed on an inner side or an outer side of the bobbin.

* * * * *